United States Patent
Liu et al.

(10) Patent No.: US 9,860,618 B2
(45) Date of Patent: Jan. 2, 2018

(54) UPSTREAM WAVELENGTH CALIBRATION IN OPTICAL NETWORKS

(71) Applicant: Futurewei Technologies, Inc., Plano, TX (US)

(72) Inventors: Dekun Liu, Wuhan (CN); Frank Effenberger, Colts Neck, NJ (US); Yuanqiu Luo, Cranbury, NJ (US); Jianhe Gao, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 160 days.

(21) Appl. No.: 14/867,673

(22) Filed: Sep. 28, 2015

(65) Prior Publication Data

US 2016/0105253 A1    Apr. 14, 2016

Related U.S. Application Data

(60) Provisional application No. 62/057,897, filed on Sep. 30, 2014.

(51) Int. Cl.
*H04Q 11/00*    (2006.01)

(52) U.S. Cl.
CPC . *H04Q 11/0067* (2013.01); *H04Q 2011/0064* (2013.01); *H04Q 2011/0083* (2013.01)

(58) Field of Classification Search
CPC ....... H04Q 11/0067; H04Q 2011/0064; H04Q 2011/0083; H04J 14/0282; H04J 14/0226; H04J 3/1694; H04N 7/22
See application file for complete search history.

(56) References Cited

U.S. PATENT DOCUMENTS

2015/0365191 A1* 12/2015 Lee ................ H04J 14/0246
398/67
2016/0087748 A1* 3/2016 Khotimsky .......... H04B 10/272
398/67

OTHER PUBLICATIONS

"40-Gigabit-capable Passive Optical Networks (NG-PON2): Transmission Convergance Layer Specification," Draft New Reconmmendation ITU-T G.989.3, G989-3_New_LC-text, Jul. 13, 2015, 290 pages.
"Optical Line Terminal (OLT) Support of Optical Network Unit (ONU) Calibration," U.S Appl. No. 14/313,550, filed May 15, 2015, 19 pages.

* cited by examiner

*Primary Examiner* — Ted Wang
(74) *Attorney, Agent, or Firm* — Conley Rose, P.C.

(57) ABSTRACT

An optical line terminal (OLT) comprises a processor configured to designate an extended quiet window having a start time and a stop time. The processor may be further configured to suspend upstream transmission during the extended quiet window. The OLT further comprises a transmitter that transmits a serial number (SN) grant to an optical network unit (ONU) during the extended quiet window. Upon receiving the SN grant, the ONU may transmit a plurality of calibration request messages during the extended quiet window. Each of the calibration request messages correspond to a different attempt wavelength. The OLT may receive one of the calibration request messages at a successful attempt wavelength. The OLT transmits a calibration response message identifying the successful attempt wavelength.

22 Claims, 18 Drawing Sheets

| Octet | Content | Description |
|---|---|---|
| 1-2 | 0x03FF | Unassigned ONU-ID. |
| 3 | 0x01 | Message type ID "Serial_Number_ONU". |
| 4 | 0x00 | Sequence number. |
| 5-8 | Vendor_ID | The code set for the Vendor_ID is specified in [ATIS-0300220]. The four characters are mapped into the 4-byte field by taking each ASCII/ANSI character code and concatenating them.<br>Example: Vendor_ID = ABCD → Byte 5 = 0x41, Byte 6 = 0x42, Byte 7 = 0x43, Byte 8 = 0x44. |
| 9-12 | VSSN | Vendor-specific serial number. |
| 13-16 | Random_delay | The random delay used by the ONU when sending this message, expressed in bit times with respect to the nominal upstream line rate of 2.48832 Gbit/s, regardless of the actual upstream line rate of the ONU. |
| 17 | 0000 000A | A - Calibration indication, one bit field with the following significance:<br>A = 0: for activation<br>A = 1: for calibration<br>Other values reserved. |
| 18 | 0000 0TTT | TTT - Three-bit downstream wavelength Channel ID, indicating the TWDM (downstream) channel ONU is listening to. |
| 19-40 | Padding | Set to 0x00 by the transmitter; treated as "don't care" by the receiver. |
| 41-48 | MIC | Message integrity check computed using the default PLOAM integrity key. |

Serial_Number_ONU PLOAM message

FIG. 5

600 

| Octet | Content | Description |
|---|---|---|
| 1-2 | Unassigned ONU-ID | Unassigned ONU-ID. |
| 3 | 0x13 | Message type ID "US_WLCH_INFO". |
| 4 | 0x00 | Sequence number. |
| 5-8 | Vendor_ID | The code set for the Vendor_ID is specified in [ATIS-0300220]. The four characters are mapped into the 4-byte field by taking each ASCII/ANSI character code and concatenating them.<br>Example: Vendor_ID = ABCD → Byte 5 = 0x41, Byte 6 = 0x42, Byte 7 = 0x43, Byte 8 = 0x44. |
| 9-12 | VSSN | Vendor-specific serial number. |
| 13 | UUU0 000O | UUU – Three-bit upstream wavelength Channel ID.<br>O – receiving path indication<br>  O = 0, in-band,<br>  O = 1, out-of-band. |
| 14-40 | Padding | Set to 0x00 by transmitter; treated as "don't care" by receiver. |
| 41-48 | MIC | Message integrity check computed using the default PLOAM integrity key. |

US_WLCH_INFO PLOAM message

| Octet | Content | Description |
|---|---|---|
| 1-2 | 0x03FF | Unassigned ONU-ID. |
| 3 | 0x01 | Message type ID "Serial_Number_ONU". |
| 4 | 0x00 | Sequence number. |
| 5-8 | Vendor_ID | The code set for the Vendor_ID is specified in [ATIS-0300220]. The four characters are mapped into the 4-byte field by taking each ASCII/ANSI character code and concatenating them.<br>Example: Vendor_ID = ABCD → Byte 5 = 0x41, Byte 6 = 0x42, Byte 7 = 0x43, Byte 8 = 0x44. |
| 9-12 | VSSN | Vendor-specific serial number. |
| 13-16 | Random_delay | The random delay used by the ONU when sending this message, expressed in bit times with respect to the nominal upstream line rate of 2.48832 Gbit/s, regardless of the actual upstream line rate of the ONU. |
| 17 | 0000 000A | A - Calibration indication, one bit field with the following significance:<br>A = 0: for activation<br>A = 1: for calibration<br>Other values reserved. |
| 18 | 0000 0TTT | TTT - Three-bit downstream wavelength Channel ID, indicating the TWDM (downstream) channel ONU is listening to. |
| 19 | Index/label | Fast calibration message index in a message series. ⎤ 910 |
| 20-40 | Padding | Set to 0x00 by the transmitter; treated as "don't care" by the receiver. |
| 41-48 | MIC | Message integrity check computed using the default PLOAM integrity key. |

Enhanced Serial_Number_ONU PLOAM Message

FIG. 9

1000 

| Octet | Content | Description | |
|---|---|---|---|
| 1-2 | Unassigned ONU-ID | Unassigned ONU-ID | |
| 3 | 0x13 | Message type ID "US_WLCH_INFO" | |
| 4 | 0x00 | Sequence number | |
| 5-8 | Vendor_ID | The code set for the Vendor_ID is specified in [ATIS-0300220]. The four characters are mapped into the 4-byte field by taking each ASCII/ANSI character code and concatenating them.<br>Example: Vendor_ID = ABCD → Byte 5 = 0x41, Byte 6 = 0x42, Byte 7 = 0x43, Byte 8 = 0x44. | |
| 9-12 | VSSN | Vendor-specific serial number. | |
| 13 | UUU0 000O | UUU – Three-bit upstream wavelength Channel ID.<br>O – receiving path indication<br>O = 0, in-band,<br>O = 1, out-of-band. | |
| 14 | Index/label | Index from the received calibration message | ⎤― 1010 |
| 15-40 | Padding | Set to 0x00 by the transmitter; treated as "don't care" by the receiver. | ⎦ |
| 41-48 | MIC | Message integrity check computed using the default PLOAM integrity key. | |

Enhanced US_WLCH_INFO PLOAM Message

| Octet | Content | Description |
|---|---|---|
| 1-2 | 0x03FF | Unassigned ONU-ID. |
| 3 | 0x01 | Message type ID "Serial_Number_ONU". |
| 4 | 0x00 | Sequence number. |
| 5-8 | Vendor_ID | The code set for the Vendor_ID is specified in [ATIS-0300220]. The four characters are mapped into the 4-byte field by taking each ASCII/ANSI character code and concatenating them.<br>Example: Vendor_ID = ABCD → Byte 5 = 0x41, Byte 6 = 0x42, Byte 7 = 0x43, Byte 8 = 0x44. |
| 9-12 | VSSN | Vendor-specific serial number. |
| 13-16 | Random_delay | The random delay used by the ONU when sending this message, expressed in bit times with respect to the nominal upstream line rate of 2.48832 Gbit/s, regardless of the actual upstream line rate of the ONU. |
| 17 | 0000 000A | A - Calibration indication, one bit field with the following significance:<br>A = 0: for activation<br>A = 1: for calibration<br>Other values reserved. |
| 18 | 0000 0TTT | TTT - Three-bit downstream wavelength Channel ID, indicating the TWDM (downstream) channel ONU is listening to. |
| 19 | Index/label | Fast calibration message index in a message series. |
| 20-21 | StartTime | When in fast calibration, it copies the StartTime from the SN grant. |
| 22-40 | Padding | Set to 0x00 by the transmitter; treated as "don't care" by the receiver. |
| 41-48 | MIC | Message integrity check computed using the default PLOAM integrity key. |

Rows 13-16: 1330
Row 19: 1310
Rows 20-21: 1320

Enhanced Serial_Number_ONU PLOAM Message

| Octet | Content | Description |
|---|---|---|
| 1-2 | Unassigned ONU-ID | Unassigned ONU-ID. |
| 3 | 0x13 | Message type ID " US_WLCH_INFO." |
| 4 | 0x00 | Sequence number |
| 5-8 | Vendor_ID | The code set for the Vendor_ID is specified in [ATIS-0300220]. The four characters are mapped into the 4-byte field by taking each ASCII/ANSI character code and concatenating them.<br>Example: Vendor_ID = ABCD → Byte 5 = 0x41, Byte 6 = 0x42, Byte 7 = 0x43, Byte 8 = 0x44. |
| 9-12 | VSSN | Vendor-specific serial number. |
| 13 | UUU0 000O | UUU – Three-bit upstream wavelength Channel ID.<br>O – receiving path indication<br>O = 0, in-band,<br>O = 1, out-of-band. |
| 14 | Index/label | Index from the received calibration message. — 1410 |
| 15-16 | StartTime | StartTime from the received calibration message. — 1420 |
| 17-40 | Padding | Set to 0x00 by the transmitter; treated as "don't care" by the receiver. |
| 41-48 | MIC | Message integrity check computed using the default PLOAM integrity key. |

Enhanced US_WLCH_INFO PLOAM Message

FIG. 14

UPSTREAM WAVELENGTH CALIBRATION IN OPTICAL NETWORKS

CROSS-REFERENCE TO RELATED APPLICATIONS

This application claims priority to U.S. provisional patent application No. 62/057,897 filed Sep. 30, 2014 by Dekun Liu, et al., and titled "Method and System for Upstream Wavelength Fast Calibration," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over the last mile, which is the final portion of a telecommunications network that delivers communication to customers. A PON is a point-to-multipoint (P2MP) network comprised of an optical line terminal (OLT) at a central office (CO), an optical distribution network (ODN), and optical network units (ONUs) at the user premises. PONs may also comprise remote nodes (RNs) located between the OLTs and the ONUs, for instance at the end of a road where multiple customers reside.

In recent years, time-division multiplexing (TDM) PONs such as gigabit-capable PONs (GPONs) and Ethernet PONs (EPONs) have been deployed worldwide for multimedia applications. In TDM PONs, the total capacity is shared among multiple users using a time-division multiple access (TDMA) scheme, so the average bandwidth for each user may be limited to below 100 megabits per second (Mb/s).

Wavelength-division multiplexing (WDM) PONs are considered a very promising solution for future broadband access services. WDM PONs can provide high-speed links with dedicated bandwidth up to 10 gigabits per second (Gb/s). By employing a wavelength-division multiple access (WDMA) scheme, each ONU in a WDM PON is served by a dedicated wavelength channel to communicate with the CO or the OLT. Next-generation PONs (NG-PONs) and NG-PON2s may include point-to-point WDM PONs (P2P-WDM PONs), which may provide data rates higher than 10 Gb/s.

NG-PONs and NG-PON2s may also include time- and wavelength-division multiplexing (TWDM) PONs, which may also provide data rates higher than 10 Gb/s. TWDM PONs may combine TDMA and WDMA to support higher capacity so that an increased number of users can be served by a single OLT with sufficient bandwidth per user. In a TWDM PON, a WDM PON may be overlaid on top of a TDM PON. In other words, different wavelengths may be multiplexed together to share a single feeder fiber, and each wavelength may be shared by multiple users using TDMA.

SUMMARY

In one embodiment, the disclosure includes an OLT comprising a processor configured to designate a time period as an extended quiet window, wherein the time period ranges from a start time to a stop time, suspend upstream transmission during the extended quiet window; and a transmitter coupled to the processor and configured to transmit a plurality of serial number (SN) grants to an optical network unit (ONU) during the extended quiet window until a calibration request message is received, wherein each of the SN grants indicates the extended quiet window and comprises an SN associated with the OLT; and a receiver coupled to the processor and configured to receive the calibration request message at an attempt wavelength during the extended quiet window.

In another embodiment, the disclosure includes an ONU comprising a receiver configured to receive a serial number (SN) grant from an optical line terminal (OLT), wherein the SN grant indicates an extended quiet window and an SN associated with the OLT, and wherein the extended quiet window is a time period ranging from a start time to a stop time; and a transmitter configured to transmit a first calibration request message at a first attempt wavelength and a second calibration request message at a second attempt wavelength during the extended quiet window and in response to receiving the SN grant.

In yet another embodiment, the disclosure includes a method implemented in an OLT, the method comprising designating an extended quiet window having a first start time and a stop time; transmitting a plurality of serial number (SN) grants to an optical network unit (ONU) during the extended quiet window until the OLT receives a calibration request message at an attempt wavelength from the ONU.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 5 and 6 are tables of messages exchanged during ONU calibration.

FIGS. 9 and 10 are tables of messages exchanged during ONU calibration according to an embodiment of the disclosure.

FIGS. 13 and 14 are tables of messages exchanged during ONU calibration according to an embodiment of the disclosure.

DETAILED DESCRIPTION

Figure 1:
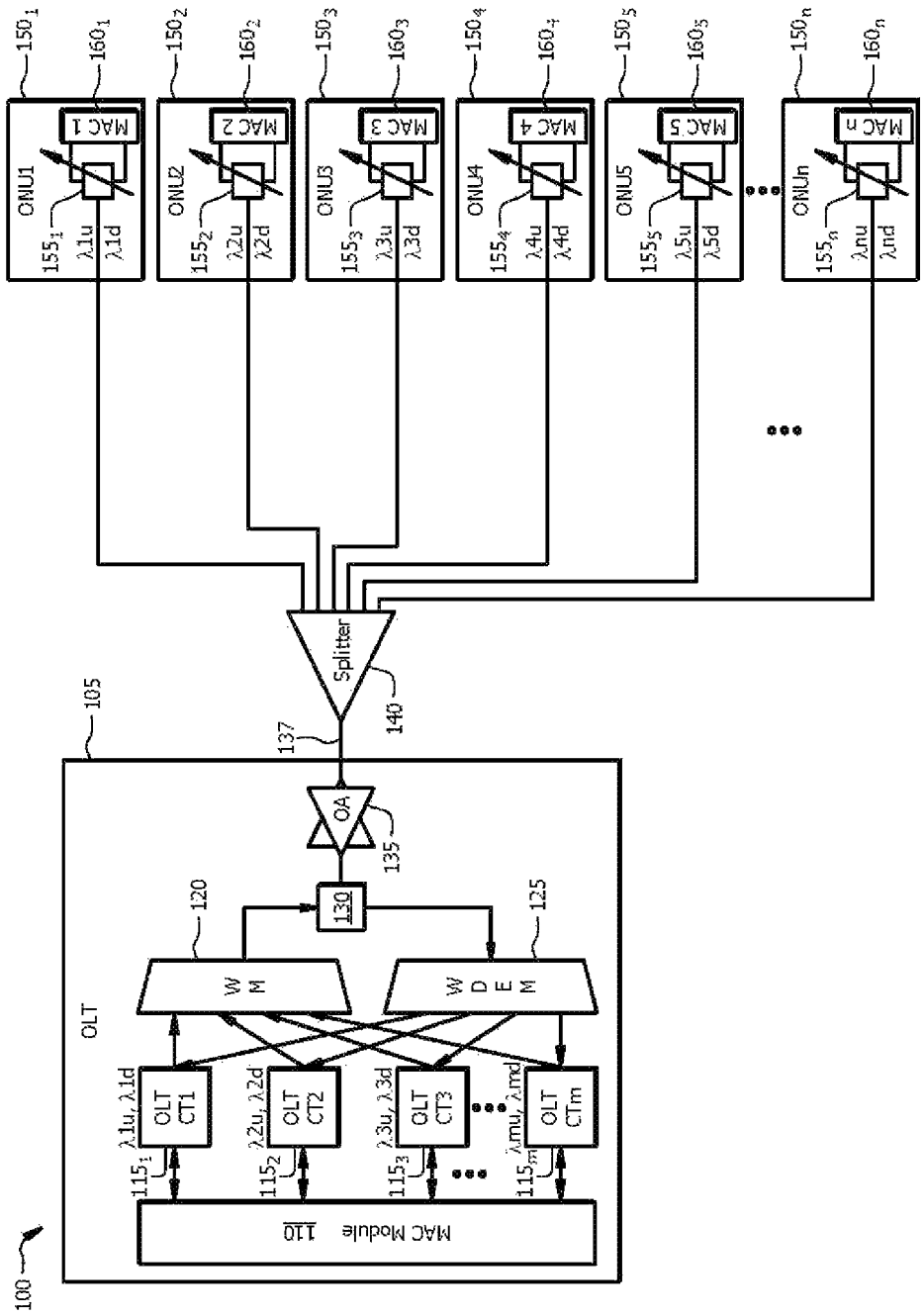
FIG. 1 is a schematic diagram of a TWDM PON.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

NG-PONs and NG-PON2s, including multiple-wavelength PONs such as WDM PONs, P2P-WDM PONs, and TWDM PONs, employ multiple transmission wavelengths to increase network capacity. For example, NG-PON2s may provide a network capacity of about 40 Gb/s. In a multiple-wavelength PON, an OLT manages multiple upstream wavelength channels and multiple downstream wavelength channels and assigns ONUs with upstream and downstream wavelength channels. Upstream may refer to the direction of communication from an ONU to the OLT. Downstream, on the other hand, may refer to the direction of communication from the OLT to the ONU. As such, ONUs that operate in multiple-wavelength PONs are wavelength-tunable ONUs, which are built with optical modules that are wavelength tunable in both the upstream and the downstream directions. For example, a tunable optical module may comprise a configurable optical tunable filter in a receive path for selecting a receive wavelength and a tunable wavelength controller in a transmit path for tuning to a transmit wavelength. The tunable optical modules may be designed by employing various technologies such as thermal tuning, voltage or current tuning, and mechanical tuning.

In a typical TWDM PON, there may be up to eight wavelength channels or demultiplexer channels, in both the downstream direction and the upstream direction. ONU calibration is a process of adjusting the wavelength of upstream optical signals that an ONU transmits. ONUs perform calibration attempts at various attempt wavelengths, which refer to single wavelengths at which an ONU is transmitting data. Calibration is necessary for an un-calibrated ONU or an already-calibrated or pre-calibrated ONU that is experiencing performance degradation. Calibration may also be performed on an ONU periodically at pre-defined time intervals. For example, an ONU may be configured to automatically recalibrate once a day. A calibration opportunity, or a quiet window or a grant window, which refers to a time interval during which the OLT temporarily suspends some upstream transmissions in order to receive calibration attempts from ONUs.

Offline transmitter calibration refers to calibration when an ONU is pre-calibrated before registering with a PON. Online transmitter calibration refers to calibration when the ONU must register with the PON in order to determine from an OLT the transmitter calibration record. The transmitter calibration record establishes an association between the specified parameters of the available wavelength channels and the corresponding values of the ONU transmitter tuning control parameters. In one embodiment, the ONU may not know the wavelengths of any working upstream wavelength channels or know how to calibrate itself to transmit in a specific upstream wavelength channel. In another embodiment, the ONU may know some of the wavelengths of all working upstream wavelength channels and know the calibration record for those known wavelength channels.

FIG. 1 is a schematic diagram of a TWDM PON 100. The TWDM PON 100 is suitable for implementing the disclosed embodiments. The TWDM PON 100 may be a communications network that does not require any active components to distribute data between an OLT 105 and ONUs$_{1-n}$ 150$_{1-n}$. Instead, the TWDM PON 100 uses passive optical components to distribute data between the OLT 105 and the ONUs$_{1-n}$ 150$_{1-n}$. The TWDM PON 100 adheres to any standard related to multiple-wavelength PONs. The TWDM PON 100 comprises the OLT 105, a splitter 140, and the ONUs$_{1-n}$ 150$_{1-n}$, where n may be any positive integer.

The OLT 105 may be any device configured to communicate with the ONUs$_{1-n}$ 150$_{1-n}$ and another network. For example, the backbone network connects the TWDM PON 100 to the Internet. Specifically, the OLT 105 acts as an intermediary between the other network and the ONUs$_{1-n}$ 150$_{1-n}$. For instance, the OLT 105 forwards data received from the network to the ONUs$_{1-n}$ 150$_{1-n}$ and forwards data received from the ONUs$_{1-n}$ 150$_{1-n}$ to the other network. When the other network uses a network protocol that differs from the PON protocol used in the TWDM PON 100, the OLT 105 may comprise a converter (not shown) that converts the network protocol to the PON protocol. The OLT 105 converter also converts the PON protocol into the network protocol.

The OLT 105 may comprise a media access control (MAC) module 110, OLT C$_{1-m}$ 115$_{1-m}$, a wavelength multiplexer (WM) 120, a wavelength demultiplexer (WDEM) 125, a local oscillator (LO) 130, and a bi-directional optical amplifier (OA) 135. The MAC module 110 may be any module suitable for processing signals for use at a physical layer in a protocol stack. For example, the MAC module 110 provides addressing and channel access control services to the physical layer, as described more fully below. For example, the MAC module 110 determines upstream and downstream transmission schedules and performs packet address filtering operations. A downstream schedule comprises downstream transmission opportunities for the OLT 105 to transmit downstream signals to the ONUs 150. An upstream schedule comprises upstream transmission opportunities for the ONUs 150 to transmit upstream signals to the OLT 105. A TWDM PON 100 transmission opportunity may include a wavelength channel and a time slot, as described more fully below. In a transmit direction or a downstream direction, the MAC module 110 instructs the OLT CTs 115 to transmit downstream signals to the ONUs 150 according to the downstream transmission schedules and to provide the upstream transmission schedules to the ONUs 150. In a receive direction or an upstream direction, the MAC module 110 instructs the OLT CTs 115 to receive and process upstream signals transmitted by the ONUs 150 and performs packet processing functions. The OLT CTs 115 comprise transmitters (not shown) and receivers (not shown).

The transmitters comprise tunable lasers or other devices suitable for converting electrical signals into optical signals and transmitting the optical signals on separate downstream wavelength channels to the WM 120. The receivers comprise photodiodes or other devices suitable for receiving optical signals from a plurality of upstream wavelength channels and converting the received optical signals into electrical signals. As shown, the downstream wavelength channels employ a first set of m wavelengths at $\lambda 1_d$ to $\lambda m_d$ and the upstream wavelength channels employ a second set of m wavelengths at $\lambda 1_u$ to $\lambda m_u$. Each OLT CT 115 employs a pair of upstream and downstream wavelength channels to communicate with one or more ONUs 150. The WM 120 may be any suitable wavelength multiplexer, such as an arrayed waveguide grating (AWG). The WM 120 may multiplex the downstream wavelength channels signals generated by the OLT CTs 115 into a combined downstream signal and forward the combined downstream signal to the LO 130. The LO 130 adds characteristics to the combined transmitted signal in order for the $ONUs_{1-n}$ $150_{1-n}$ to properly extract the signals. The LO 130 then forwards the combined transmitted signal to the OA 135, which may amplify the combined transmitted signal as needed in order to forward the combined transmitted signal to a splitter 140 via an optical fiber 137. The OA 135 also receives a combined received signal from the splitter 140 via the optical fiber 137 and amplifies the combined received signal as needed in order to forward the combined received signal to the WDEM 125. The WDEM 125 may be similar to the WM 120 and may demultiplex the combined received signal into multiple optical signals, then forward the multiple optical signals to the OLT $CT_{1-m}$ $115_{1-m}$.

The splitter 140 may be any device suitable for splitting the combined optical signals and forwarding the split signals to the $ONUs_{1-n}$ $150_{1-n}$. The splitter 140 may also be any device suitable for receiving signals from the $ONUs_{1-n}$ $150_{1-n}$, combining those signals into a combined received signal, and forwarding the combined received signal to the OA 135. For example, the splitter 140 splits a downstream optical signal into n split downstream optical signals in the downstream direction (e.g., from the OLT 105 to the $ONUs_{1-n}$ $150_{1-n}$), and combines n upstream optical signals into one combined upstream optical signal in the upstream direction (e.g., from the $ONUs_{1-n}$ $150_{1-n}$ to the OLT 105).

The $ONUs_{1-n}$ $150_{1-n}$ may be any devices suitable for communicating with the OLT 105. The $ONUs_{1-n}$ $150_{1-n}$ may comprise wavelength tunable components $155_{1-n}$ and MAC $modules_{1-n}$ $160_{1-n}$. The wavelength tunable components $155_{1-n}$ comprise wavelength tunable transmitters and wavelength tunable filters (not shown). The MAC $modules_{1-n}$ $160_{1-n}$ are similar to the MAC module 110.

The TWDM PON 100 provides WDM capability by associating a downstream wavelength (e.g., $\lambda 1d, \lambda 2d, \ldots, \lambda nd$) and an upstream wavelength (e.g., $\lambda 1u, \lambda 2u, \ldots, \lambda nu$) with each OLT $CT_{1-m}$ $115_{1-m}$ so that a plurality of wavelengths are present. The TWDM PON 100 then combines those wavelengths into a single optical fiber 137 and distributes the wavelengths to the $ONUs_{1-n}$ $150_{1-n}$ through the splitter 140. The TWDM PON 100 may provide TDM as well.

Figure 2:
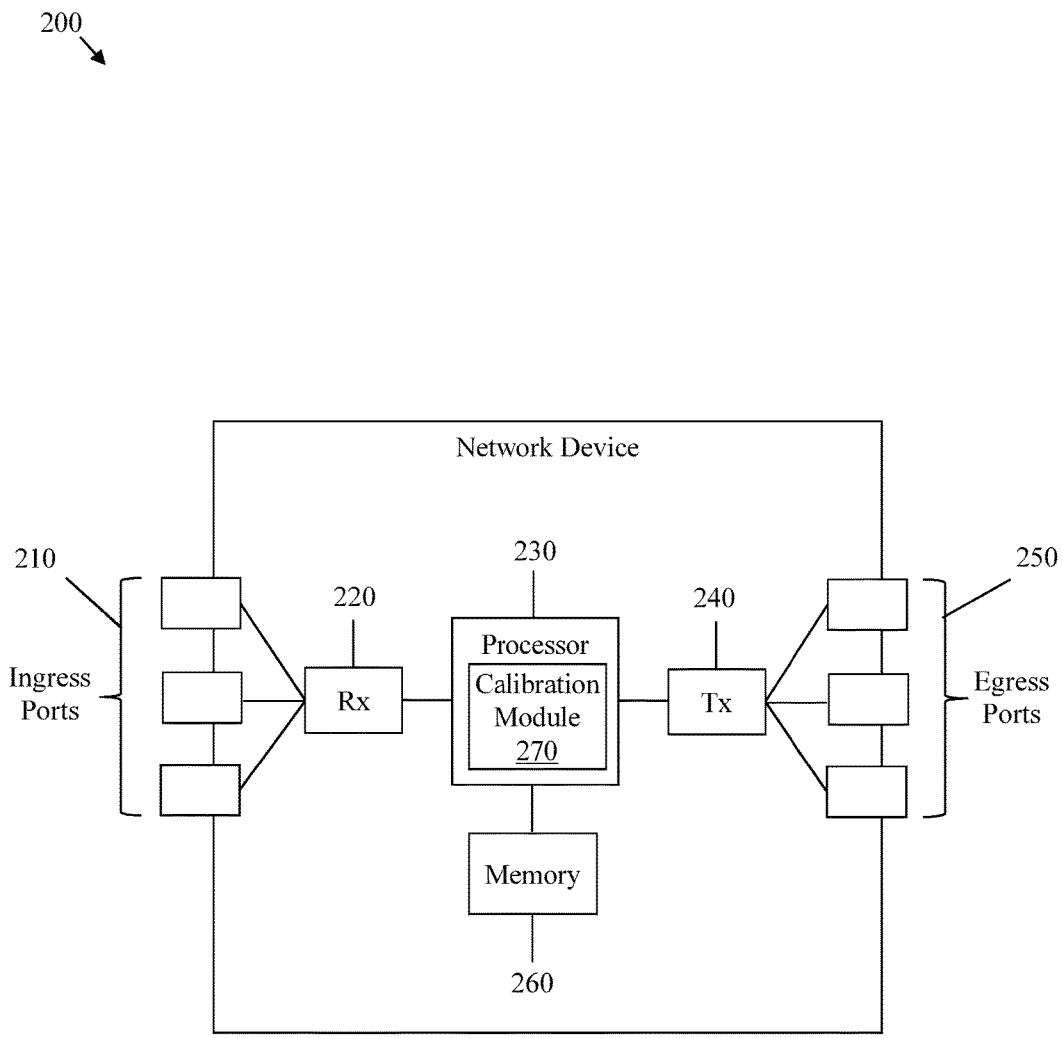
FIG. 2 is a schematic diagram of a network device.

FIG. 2 is a schematic diagram of a network device 200. The device 200 is suitable for implementing the OLT 105, the ONU 150, and the disclosed embodiments, including the message sequence diagrams 700 and 1100 and the methods 1700 and 1800. The network device 200 comprises ingress ports 210 and receiver units (Rx) 220 for receiving data; a processor, logic unit, or central processing unit (CPU) 230 to process the data; transmitter units (Tx) 240 and egress ports 250 for transmitting the data; and a memory 260 for storing the data. The network device 200 may also comprise optical-to-electrical (OE) components and electrical-to-optical (EO) components coupled to the ingress ports 210, receiver units 220, transmitter units 240, and egress ports 250 for egress or ingress of optical or electrical signals.

The processor 230 may be implemented by hardware and software. The processor 230 may be implemented as one or more CPU chips, cores (e.g., as a multi-core processor), field-programmable gate arrays (FPGAs), application specific integrated circuits (ASICs), and digital signal processors (DSPs). The processor 230 is in communication with the ingress ports 210, receiver units 220, transmitter units 240, egress ports 250, and memory 260. The processor 230 comprises a calibration module 270. The calibration module 270 performs at least part of the message sequence diagrams 700 and 1100 and the methods 1700 and 1800. The inclusion of the calibration module 270 therefore provides an improvement to the functionality of the device 200. The calibration module 270 also effects a transformation of the device 200 to a different state. Alternatively, the calibration module 270 is implemented as instructions stored in the memory 260 and executed by the processor 230.

The memory 260 comprises one or more disks, tape drives, and solid-state drives and may be used as an overflow data storage device, to store programs when such programs are selected for execution, and to store instructions and data that are read during program execution. The memory 260 may be volatile and non-volatile and may be read-only memory (ROM), random-access memory (RAM), ternary content-addressable memory (TCAM), and static random-access memory (SRAM).

Figure 3:
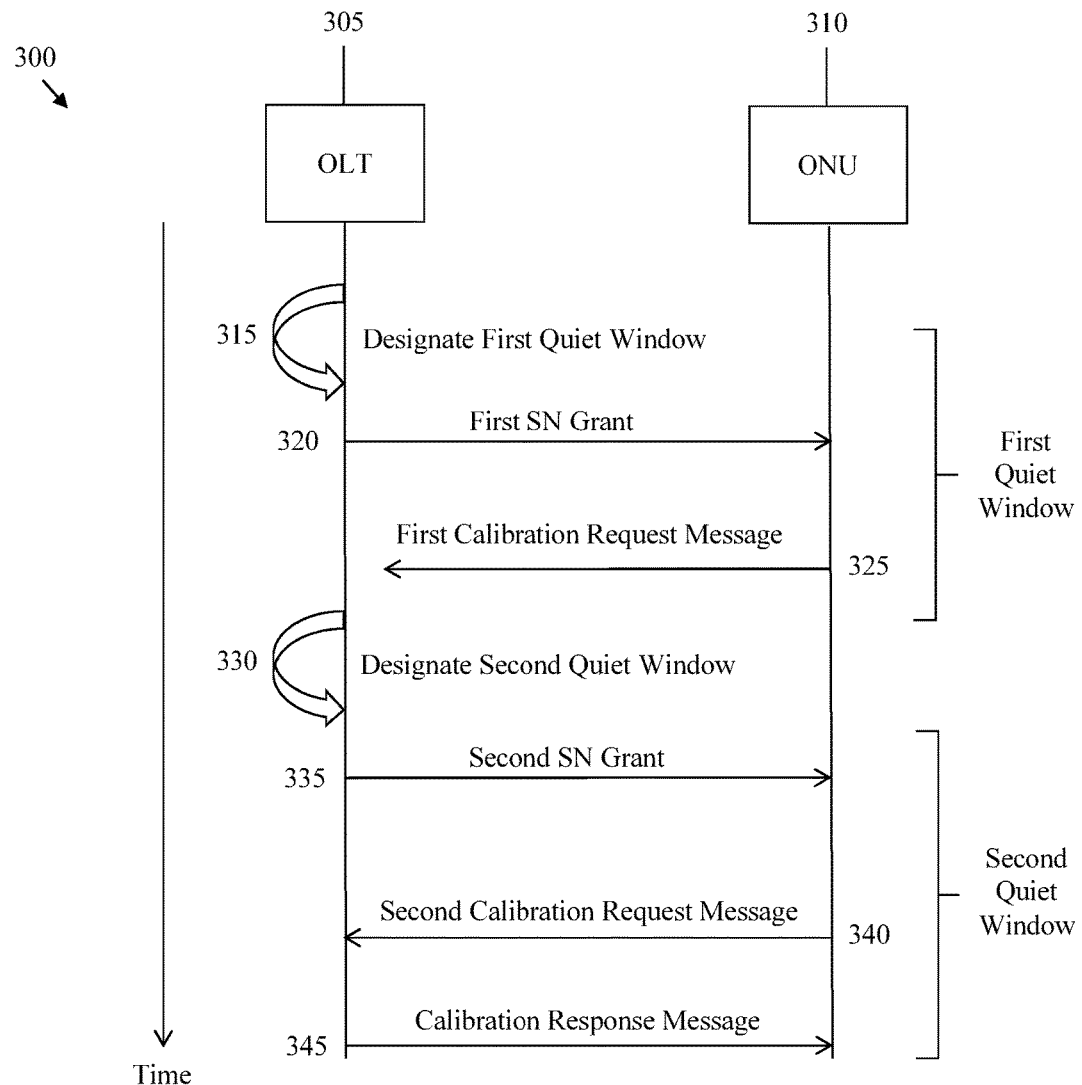
FIG. 3 is a message sequence diagram of ONU calibration.

FIG. 3 is a message sequence diagram 300 illustrating ONU calibration. The calibration is described in "40-Gigabit-capable Passive Optical Networks (NG-PON2) Transmission Convergence Layer Specification" ("G.989.3 Draft"), which is incorporated by reference. The G.989.3 Draft discloses a process for ONU calibration when an ONU joins or resumes operations on a conventional TWDM PON system. The diagram 300 illustrates messages exchanged between an OLT 305 and an ONU 315. The TWDM PON 100 of FIG. 1 may implement the ONU calibration depicted in FIG. 3. In such cases, the OLT 305 and the ONU 310 may be any OLT $105_{1-m}$ and any $ONU_{1-n}$ $150_{1-n}$, respectively.

At step 315, the OLT 305 designates a first quiet window during which the ONU 310 may transmit messages to the OLT 305 so that the OLT 305 is able to discover the ONU 310. The first quiet window may be a time period of about 250 microseconds (μs). The OLT 305 temporarily suspends at least a portion of upstream transmissions during the first quiet window to avoid collisions between data upstream transmissions and newly activated ONU 310 calibration messages. In this way, the OLT 305 can distinguish between calibration request messages and data transmissions.

At step 320, the OLT 305 transmits a first SN grant or an SN grant message during the first quiet window. The first SN grant includes the SN of the OLT 305 and invites an ONU 310 to transmit to the OLT 305. At step 325, the ONU 310 transmits a first calibration request message at a first attempt wavelength. The first calibration request message may be, for example, an SN ONU physical layer operation, administration and maintenance (PLOAM) message or a calibration PLOAM message. The first calibration request message may include the SN of the OLT 310 received from the SN grant. As shown in diagram 300, the OLT 305 does not receive the first calibration request message 325 because the first attempt wavelength may not be the upstream channel assigned to the ONU 310 by the OLT 305.

The OLT 305 has to designate another quiet window because the OLT 305 may only send one SN grant and the ONU 310 may only send one calibration request message during one quiet window. Therefore, at step 330, the OLT 305 designates the second quiet window for the ONU 310 to test another attempt wavelength. At step 335, the OLT 305 then transmits a second SN grant to the ONU 310 during the second quiet window. At step 340, the ONU 310 transmits a second calibration request message at a second attempt wavelength that is different from the first attempt wavelength. The second attempt wavelength is the upstream channel assigned to the ONU 310 by the OLT 305. Therefore, the OLT 310 successfully receives the second calibration request message 340.

At step 345, the OLT 305 sends a calibration response message 345 in response to receiving the calibration request message. The ONU 310 recognizes that the second attempt wavelength is the working wavelength of the upstream channel upon receiving the calibration request message. If the ONU 310 does not receive a calibration response message within a specified time period, then the ONU 310 determines that the second attempt wavelength is not the working wavelength of the upstream channel.

As shown in FIG. 3, the ONU 310 sends only one calibration request message at one attempt wavelength for each SN grant received or for each quiet window. The ONU calibration scheme described in diagram 300 is time consuming because it requires the OLT 305 to designate a new quiet window and transmit another SN grant before the ONU 310 can transmit a calibration request message.

Figure 4:
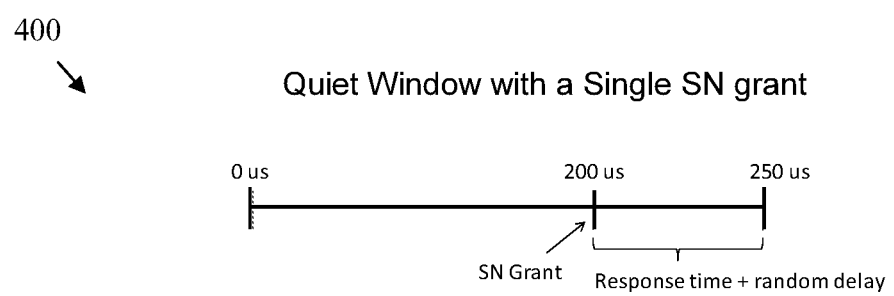
FIG. 4 is a diagram of a quiet window.

FIG. 4 is a diagram of a quiet window 400 with a single SN grant. The quiet window 400 is described in the G.989.3 Draft and may be the first quiet window 315 or the second quiet window 330 in FIG. 3. As shown, the quiet window 400 is about 250 µs long. During the quiet window 400, the OLT transmits an SN grant at about 200 µs, leaving about 50 µs is remaining for an ONU response and a random time delay. The OLT may only send SN grant during a quiet window.

FIG. 5 is a table of a calibration request message 500. The calibration request message 500 is described in the G.989.3 Draft and may be the first calibration request message 325 or the second calibration request message 340 of FIG. 3. For example, as shown, the calibration request message 500 may be a Serial_Number_ONU PLOAM message. The calibration request message 500 is a standalone message transmitted from the ONU to the OLT. As shown, the calibration request message 500 does not include a start time indicating a time at which the OLT sent an SN grant or an identifier of the wavelength at which the ONU sends the calibration request message 500.

FIG. 6 is a table of a calibration response message 600. The calibration response message 600 is described in the G.989.3 Draft and may be the calibration response message 345 of FIG. 3. For example, as shown, the calibration response message 600 may be a US_WLCH_INFO PLOAM message. The calibration response message 600 is a standalone message transmitted from the OLT to the ONU. As shown, the calibration response message 600 does not include a start time indicating a time at which an OLT sent an SN grant or an identifier of the wavelength at which the OLT received the calibration request message.

The G.989.3 Draft permits the ONU to transmit only one calibration request message at one attempt wavelength in response to receiving one SN grant from the OLT. Such a calibration request message has a limited chance of being received by the OLT. For example, when the ONU attempt wavelengths are well aligned to the upstream wavelength channels, the probability of selecting an accurate attempt wavelength during a single calibration attempt is 1/M, where M is the number of upstream channels. ONU attempt wavelengths are well aligned to the upstream wavelength channels when the ONU transmitter is capable of transmitting at a given target transmission wavelength with a spectral excursion not exceeding δ, where δ represents the accuracy of alignment. ONU attempt wavelengths are not fully aligned to the upstream wavelength channels when the ONU transmitter transmits at a given target transmission wavelength with a spectral excursion that exceeds δ. However, in a more general case when the ONU attempt wavelengths are not fully aligned to the upstream wavelength channels, the probability of selecting an accurate attempt wavelength during a single calibration attempt is A/B, where A is the width of the upstream channel pass band and B is the width of channel spacing. Furthermore, methods of ONU calibration according to the G.989.3 Draft do not account for transmission collisions, or when the calibration request messages from two or more ONUs arrive at the OLT simultaneously. In this case, the OLT will not respond to either of the calibration request messages in the event of a transmission collision even though the attempt wavelengths by which the signals were sent were in the pass band of the upstream channel. Therefore, the ONU calibration method in the G.989.3 Draft is inefficient because fully completing upstream calibration can be time consuming and ineffective.

Disclosed herein are embodiments for fast online calibration of an ONU. An OLT may designate an extended quiet window during which ONUs may transmit calibration request messages to the OLT. In addition, the OLT may issue one or more SN grants during the extended quiet window. The ONU may transmit multiple upstream calibration request messages during the extended quiet window. Each of the calibration request messages may be at a different attempt wavelength. Both the upstream calibration request messages and the downstream calibration response messages may be PLOAM messages. The disclosed embodiments are with respect to a TWDM PON, but may also apply to any PON supporting the ONU online calibration.

Figure 7:
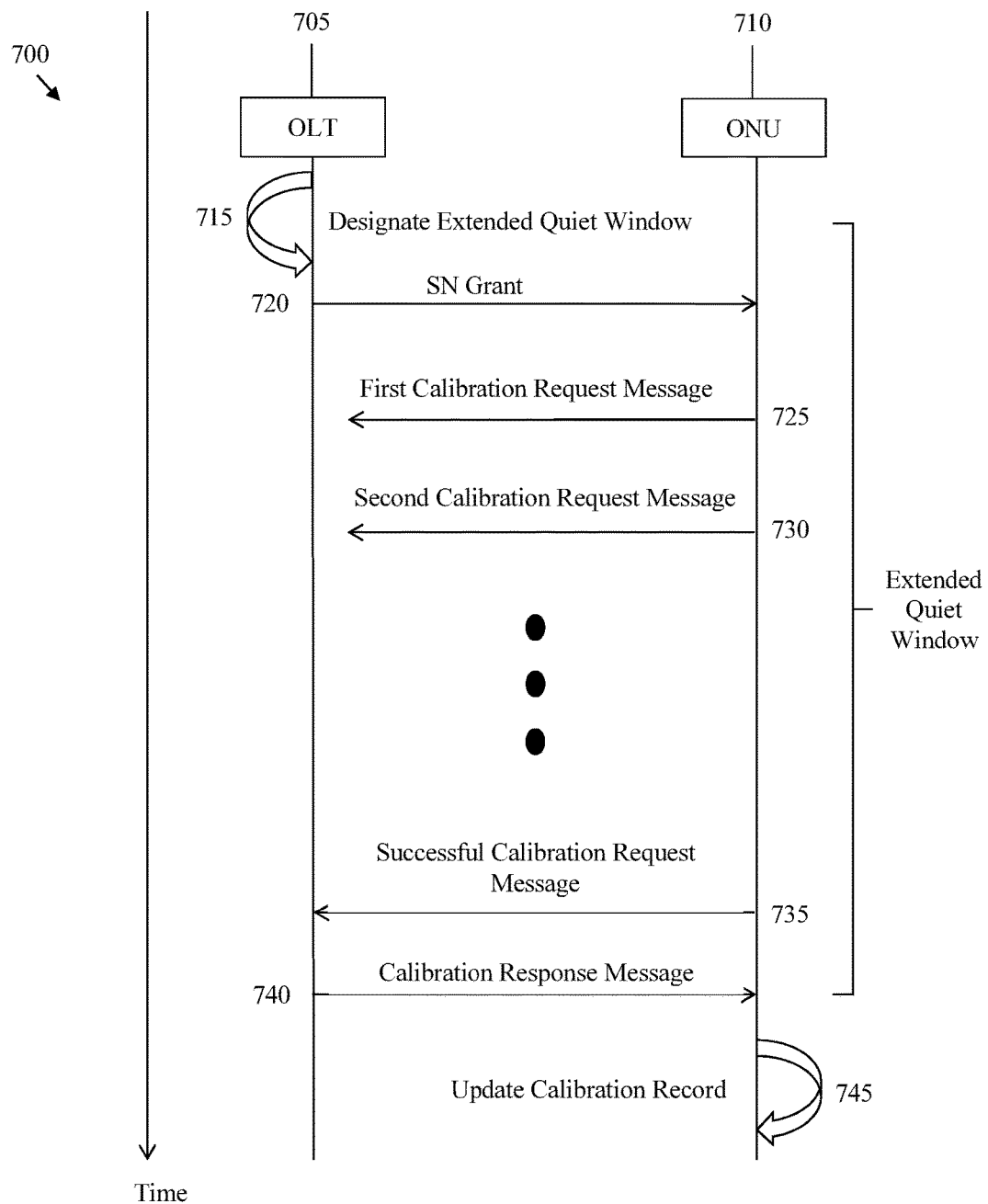
FIG. 7 is a message sequence diagram for ONU calibration according to an embodiment of the disclosure.

FIG. 7 is a message sequence diagram 700 illustrating ONU calibration according to an embodiment of the disclosure. The diagram 700 is similar to the diagram 300 of FIG. 3, except that the ONU 710 sends multiple calibration request messages during an extended quiet window. The TWDM PON 100 of FIG. 1 may implement the ONU calibration depicted in FIG. 7. The diagram 300 illustrates messages exchanged between an OLT 705 and an ONU 710. The OLT 705 and the ONU 710 may be any OLT $105_{1-m}$ and any $ONU_{1-n}$ $150_{1-n}$, respectively.

At step 715, the OLT 705 designates an extended quiet window to receive ONU calibration request messages from the ONU 710. The extended quiet window is designated to have a longer time period than the quiet window 400 shown in FIG. 4. For example, the extended quiet window designated by the OLT 705 is about 375 µs is long or more.

At step 720, the OLT 705 transmits an SN grant to the ONU 710. The SN grant invites the ONU 710 to send calibration request messages to the OLT 705. The SN grant may include the serial number of the OLT 705, as well as the start time and the stop time of the extended quiet window. At step 725, the ONU 710 transmits a first calibration request message at a first attempt wavelength. The ONU 710 waits for a predetermined amount of time to receive a calibration response message from the OLT 705.

If the ONU 710 does not receive a calibration response message from the OLT 705, the ONU 710 adjusts a tuner of a transmitter, such as the transmitter unit 240 of FIG. 2, to a second attempt wavelength that is different from the first attempt wavelength. The second attempt wavelength corresponds to a next upstream channel pass band. At step 730, the ONU 710 transmits the second calibration request message at the second attempt wavelength. The ONU 710 again waits for a predetermined amount of time to receive a calibration response message from the OLT 705. If the calibration response message is not received, the ONU 710 continues to send X number of calibration request messages at different attempt wavelengths during the quiet window. X is any positive integer representing the number of calibration request messages sent.

At step 735, the ONU 710 transmits a calibration request message at an attempt wavelength that the OLT 705 successfully receives. At step 740, the OLT 705 transmits a calibration response message back to the ONU 710. The calibration response message includes an identifier associated with the successful attempt wavelength. That identifier is described in U.S. patent application Ser. No. 14/713,550 filed May 15, 2015 by Xuming Wu, et al., and titled "Optical Line Terminal (OLT) Support of Optical Network Unit (ONU) Calibration," which is incorporated by reference. Finally, at step 745, the ONU 710 determines that the attempt wavelength corresponding to the received identifier is the working wavelength of the upstream channel of the OLT 705. The ONU 710 makes that determination by comparing the received identifier to a data store that stores a table, for example, indicating which identifiers correspond to which attempt wavelengths. The ONU 710 may then update a calibration record to indicate that the successful attempt wavelength is the wavelength of the upstream channel of the OLT 705.

In contrast to the ONU 310 described in FIG. 3, which can only send a single calibration request message in response to receiving a single SN grant, the ONU 705 described in FIG. 7 may send a plurality of calibration request messages after receiving only a single SN grant during a single extended quiet window. Therefore, the ONU calibration scheme depicted in FIG. 7 is more efficient than the ONU calibration scheme in FIG. 3 because the ONU calibration scheme depicted in FIG. 7 eliminates the need for a new quiet window every time the OLT 705 sends an SN grant and every time the ONU 710 transmits a calibration request message.

Figure 8:
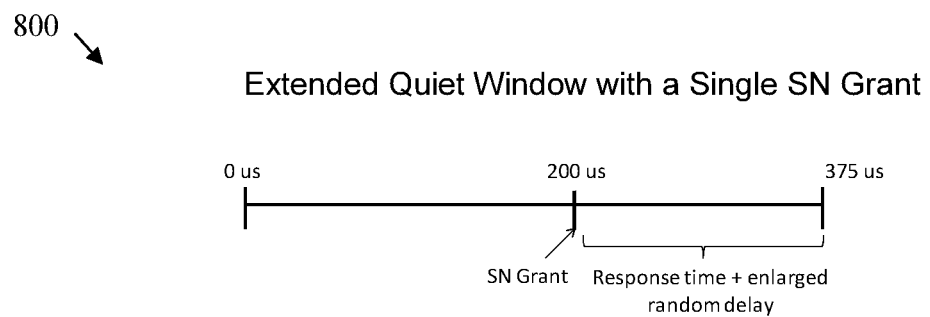
FIG. 8 is a diagram of a quiet window according to an embodiment of the disclosure.

FIG. 8 is a diagram showing an extended quiet window 800 designated by an OLT according to an embodiment of the disclosure. In particular, the extended quiet window 800 may be the extended quiet window 715 of FIG. 7. The extended quiet window 800 spans a time period of about 375 µs. Though the extended quiet window is extended to about 375 µs in diagram 800, the OLT may extend the quiet window to any time period. If the OLT transmits an SN grant at about 200 µs, the extended quiet window leaves 175 µs is remaining for the ONUs to transmit calibration request messages and for the OLT to transmit calibration response messages. The extended quiet window extends the time period during which the messages 725, 730, 735, and 740 of FIG. 7 may be sent. This significantly enlarged quiet window also accommodates random delays that may occur during the calibration process.

During the extended quiet window 800, the OLT may transmit a single SN grant, after which ONUs may transmit multiple calibration request messages in response to receiving the single SN grant (similar to the ONU calibration embodiment depicted in FIG. 7). In particular, the ONU may send a series of wavelength attempts by tuning a transmitter (e.g., the transmitter unit 240 of FIG. 2) of the ONU to the next attempt wavelength between calibration attempts. The OLT may also adjust the timing and equalization delay in granting a single SN grant during the extended quiet window 800.

FIG. 9 is a table of a calibration request message 900 according to an embodiment of the disclosure. The calibration request message 900 may be the calibration request messages 725, 730, and 735 of FIG. 7. For example, as shown, the calibration request message 900 may be an Enhanced Serial_Number_ONU PLOAM Message. The calibration request message 900 may be a standalone message transmitted from the ONU to the OLT. As shown, the calibration request message 900 includes a wavelength index 910. The wavelength index 910 is the identifier of the wavelength at which the ONU sends the calibration request message 900. The wavelength index 910 facilitates identifying which attempt wavelength corresponds to the upstream channel. Notably, the calibration request message 500 of FIG. 5 does not include the wavelength index 910.

FIG. 10 is a table of a calibration response message 1000 according to an embodiment of the disclosure. The calibration response message 1000 may be the calibration response message 740 of FIG. 7. For example, as shown, the calibration response message 1000 may be an Enhanced US_WLCH_INFO PLOAM Message. The calibration response message 1000 may be a standalone message transmitted from the OLT to the ONU. As shown, the calibration response message 1000 includes the wavelength index 1010. The wavelength index 1010 is the identifier the wavelength at which the OLT received the calibration request message. The wavelength index 1010 helps the ONU identify which attempt wavelength corresponds to the upstream channel. Notably, the calibration response message 600 of FIG. 6 does not include the wavelength index 1010.

Figure 11:
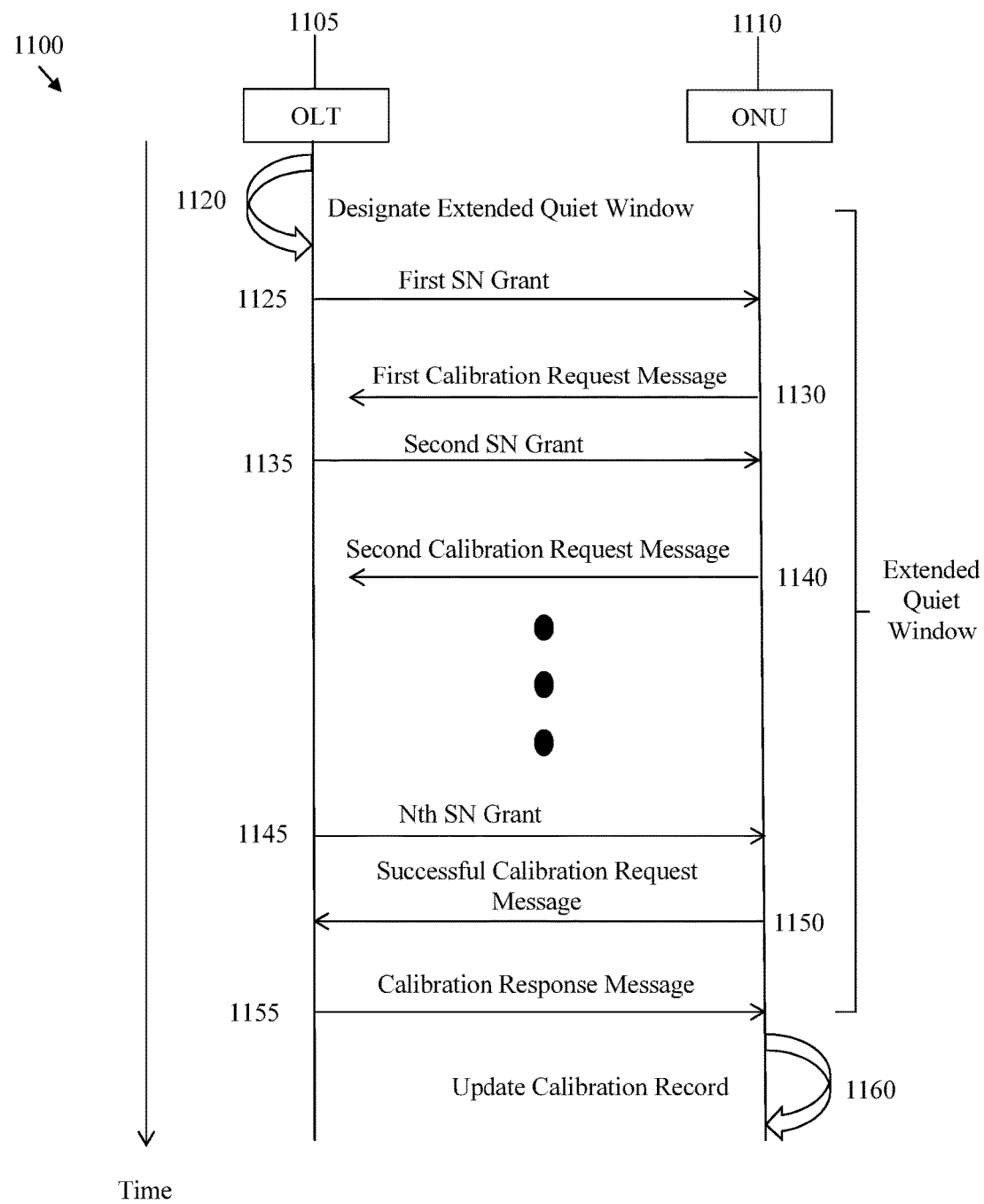
FIG. 11 is a message sequence diagram for ONU calibration according to an embodiment of the disclosure.

FIG. 11 shows a message sequence diagram 1100 according to another embodiment of the disclosure. The diagram 1100 is similar to the diagram 700 shown in FIG. 7, except that the OLT 1105 sends multiple SN grants during a single extended quiet window. The TWDM PON 100 of FIG. 1 may implement the ONU calibration depicted diagram 1100. The diagram 1100 illustrates messages exchanged between an OLT 1105 and an ONU 1110. The OLT 1105 and the ONU 1110 may be any OLT $105_{1-m}$ and any $ONU_{1-n}$ $150_{1-n}$, respectively.

At step 1120, the OLT 1105 designates an extended quiet window. At steps 1125, 1135, and 1145, the OLT 1105 transmits I number of SN grants during the extended quiet window. I is any positive integer. At step 1130, the ONU 1110 transmits a first calibration request message at a first attempt wavelength in response to receiving the first SN grant. At step 1135, if the OLT 1105 determines that a calibration request message has not been received, then the OLT 1105 may be configured to transmit a second SN grant. The ONU 1110 tunes a transmitter, such as the transmitter unit 240 of FIG. 2, of the ONU 1110 to a second attempt wavelength that is different from the first attempt wavelength. At step 1140, the ONU 1110 transmits a second calibration request message at the second attempt wavelength. In this manner, the ONU 1110 waits to receive an SN grant before transmitting the next calibration request message. In one embodiment, the ONU 1110 may transmit more than one calibration request message in response to receiving a single SN grant.

At step 1145, the OLT 1105 transmits an Nth SN grant. At step 1150, the ONU 1110 transmits a successful calibration request message at a successful upstream attempt wavelength to the OLT 1105. At step 1155, the OLT 1105 transmits a calibration response message including an identifier indicating the successful upstream attempt wavelength. At step 1160, the ONU 1110 updates the calibration record to indicate the successful upstream channel in response to receiving the calibration response message.

As shown, the OLT 1105 transmits multiple SN grants during a single extended quiet window. The ONU 1110 also transmits multiple calibration request messages during the single extended quiet window. Therefore, the embodiment of ONU calibration shown in FIG. 11 eliminates the need to designate a new quiet window for every SN grant transmitted and every calibration request transmitted. The designation of one extended quiet window speeds up the process of the ONU calibration significantly by eliminating the time necessary to designate multiple quiet windows for each calibration attempt.

Figure 12:
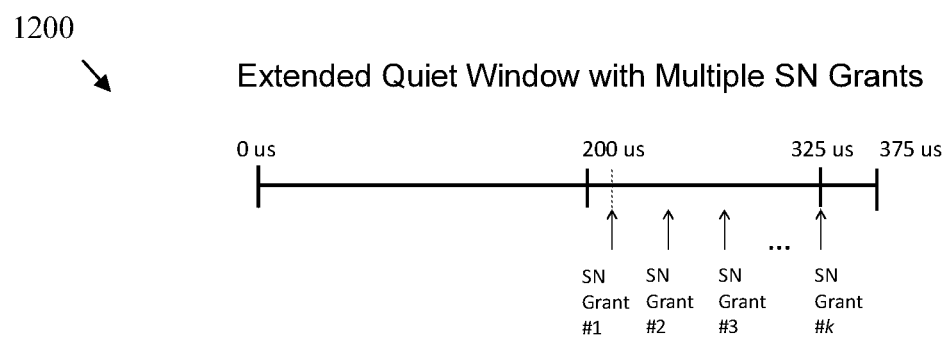
FIG. 12 is a diagram of a quiet window according to an embodiment of the disclosure.

FIG. 12 is a diagram of extended quiet window 1200 designated by an OLT according to an embodiment of the disclosure. In particular, the extended quiet window 1200 may be the extended quiet window 1120 of FIG. 11. Similar to the extended quiet window shown in diagram 800, the extended quiet window shown in diagram 1200 also extends the time period to about 375 μs. Though the extended quiet window is extended to about 375 μs, the OLT may extend the quiet window to any time period. As shown, the OLT transmits K number of SN grants during a single extended quiet window. The OLT sends the first SN grant at about 200 μs and the last SN grant at about 325 μs. The extended quiet window shown in diagram 1200 extends the time period during which the messages 1125, 1130, 1135, 1140, 1145, 1150, and 1155 of FIG. 11 are sent. The OLT may adjust the timing and equalization delay in granting multiple SN grants during the extended quiet window.

The ONUs may send only one calibration request message in response to receiving one SN grant. For example, an ONU may be permitted to transmit only one calibration request message at one attempt wavelength between the time of receiving SN Grant #1 and SN Grant #2. In another embodiment, the ONUs may send multiple calibration request messages in response to receiving one SN grant. For example, the ONU may send multiple calibration request messages at multiple wavelengths in between receiving SN grant #1 and SN Grant #2.

FIG. 13 is a table of a calibration request message 1300 according to an embodiment of the disclosure. In particular, the calibration request message 1300 may be the calibration request messages 1130, 1140, and 1150 of FIG. 11. For example, as shown, the calibration request message 1300 may be an Enhanced Serial_Number_ONU PLOAM Message. The calibration request message 1300 may be a standalone message transmitted from the ONU to the OLT. As shown, the calibration request message 1300 includes a wavelength index 1310 and a start time 1320. The wavelength index 1310 is the identifier of the attempt wavelength at which the ONU sends calibration request message 1300. The start time 1320 indicates a start time at which the OLT sent the SN grant. The wavelength index 1310 and the start time 1320 help the ONU identify which attempt wavelength corresponds to the upstream channel. Notably, the calibration request message 500 of FIG. 5 does not include the wavelength index 1310 and the start time 1320. In one embodiment, the calibration request message 1300 may include a field for a random delay 1330. The random delay 1330 field may be used by the ONU to indicate a random delay time, which may be expressed in bit times with respect to the nominal upstream line rate of 2.48832 Gbit/s, regardless of the actual upstream line rate of the ONU.

FIG. 14 is a table of a calibration response message 1400 according to an embodiment of the disclosure. In particular, the calibration response message 1000 may be the calibration response message 1155 of FIG. 11. For example, as shown, the calibration response message 1400 may be an Enhanced US_WLCH_INFO PLOAM Message. The calibration response message 1400 may be a standalone message transmitted from the OLT to the ONU. As shown, the calibration response message 1400 includes a wavelength index 1410 and a start time 1420. The wavelength index 1410 is the identifier of the attempt wavelength at which the ONU sends the calibration request message. The start time 1420 indicates the time at which the OLT sends the SN grant. The wavelength index 1410 and the start time 1220 help the ONU identify which attempt wavelength corresponds to the upstream channel. Notably, the calibration response message 600 of FIG. 6 does not include the wavelength index 1410 and the start time 1420.

Figure 15:
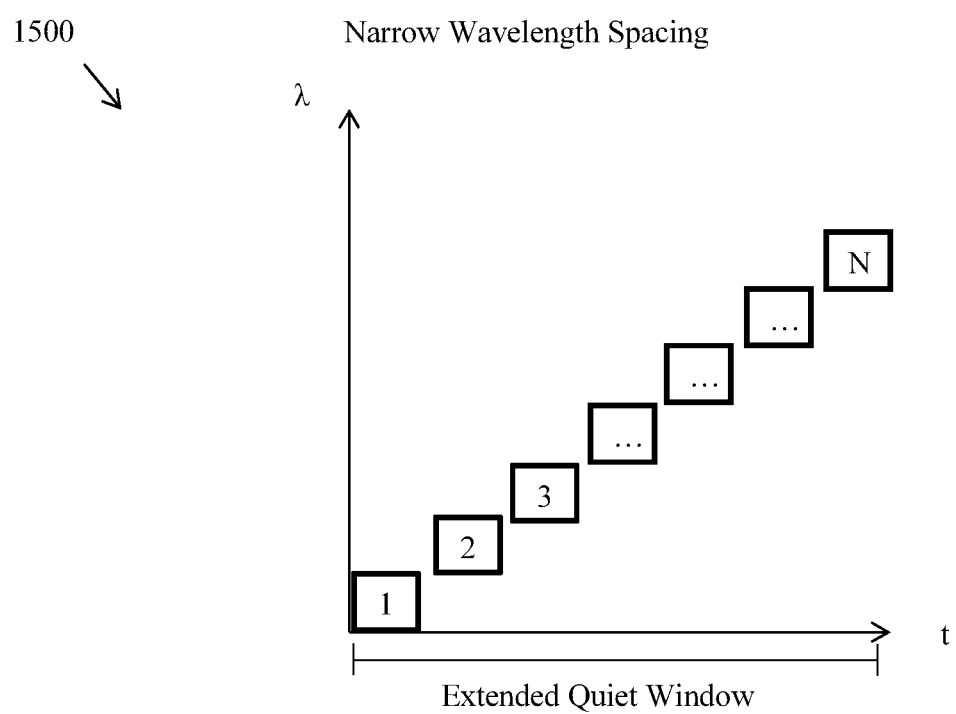
FIGS. 15 and 16 are graphs illustrating attempt wavelength spacing according to various embodiments of the disclosure.

FIG. 15 is graph 1500 illustrating the narrow spacing between attempt wavelengths according to an embodiment of the disclosure. In particular, graph 1500 shows a narrow wavelength spacing scheme in which the attempt wavelengths are spaced closer together than the wide wavelength spacing scheme shown in the graph 1600 of FIG. 16. In graph 1500, the x axis represents time and the y axis represents the attempt wavelengths. The graph 1500 shows boxes 1-N that represent calibration request messages sent during an extended quiet window. N is any integer value. The extended quiet window is divided into N sub-windows such that an ONU sends a calibration request message during each of the N sub-windows.

The attempt wavelengths are spaced apart relatively close to each other in the narrow wavelength spacing embodiment shown in graph 1500. For example, the attempt wavelengths may be spaced apart such that each of the calibration attempts during an extended quiet window is performed on one passband of the OLT demultiplexer transmission. The TWDM PON 100 of FIG. 1 may implement the embodiment of ONU calibration with narrow attempt wavelength spacing depicted in FIG. 15. A transmitter, such as the transmitter unit 240 of FIG. 2, may tune to transmit the calibration request messages at the attempt wavelengths shown. If the TWDM PON upstream wavelength channel spacing is S, then the OLT demultiplexer passband should be about S. If the number of calibration request messages in an extended quiet window is N, then the narrow attempt wavelength spacing can be set as S/N. The factors to determine N can include ONU transmitter wavelength tuning speed and the calibration accuracy. If the upstream wavelength channel spacing is 0.8 nanometers (nm) and there are 5 attempts in an extended quiet window, then the attempt wavelength spacing is then 0.16 nm. In this way, the narrow attempt wavelength spacing embodiment for ONU calibration may guarantee that one of the attempt wavelengths is in the passband of the upstream channel of the OLT 105.

Figure 16:
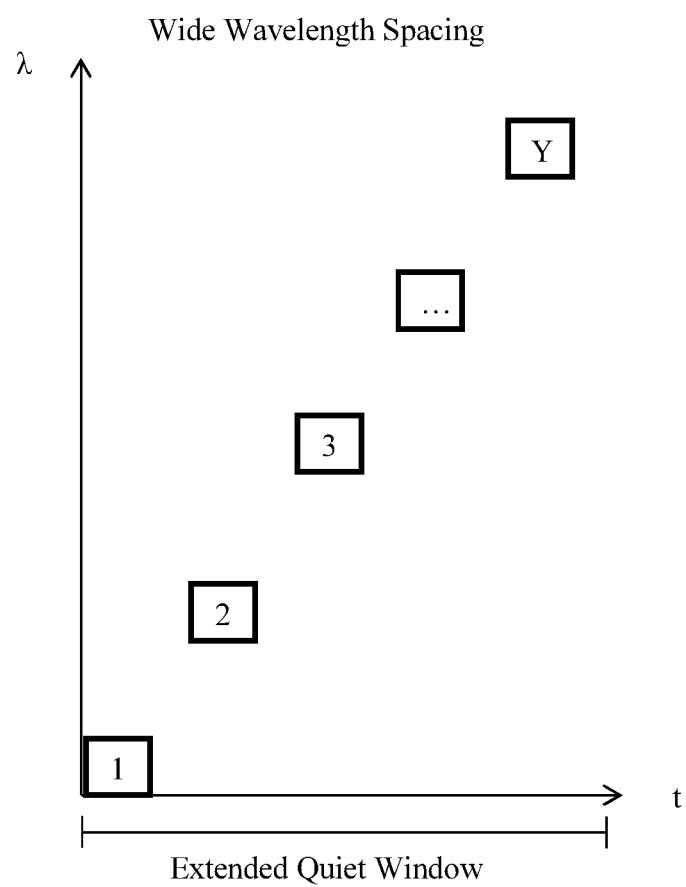

FIG. 16 is a graph 1600 illustrating wide spacing between attempt wavelengths according to another embodiment of the disclosure. Graph 1600 is similar to graph 1500 of FIG. 15, except that the boxes 1-Y represent the calibration attempts performed. The quiet window may be divided into Y sub-windows. Y represents a number of upstream wavelength channels, and Y is any positive integer. As shown in graph 1600, the ONU transmits calibration attempts at wavelengths that are spread apart wider than the attempt wavelengths shown in graph 1500 of FIG. 15.

The wide wavelength spacing between each attempt wavelength is based on the Vernier effect, where there are Y attempt wavelengths and Y is the number of available upstream channels. Accordingly, the ratio of the spacing lengths of the attempt wavelengths to the spacing lengths of the available upstream channels may be Y−1:Y. For example, the attempt wavelength spacing may be set to about 0.7 nm if the TWDM-PON system (e.g., the TWDM PON 100 of FIG. 1) upstream wavelength channel spacing is about 0.8 nm and there are 8 upstream wavelengths in the TWDM-PON. When the initial attempt wavelength spacing is 0.3 nm shorter than an upstream wavelength channel spacing, it takes a total of 6 attempts (including the initial attempt) to find an upstream wavelength channel. When the initial attempt wavelength spacing is 0.1 nm longer than an upstream wavelength channel spacing, it takes a total of 2 attempts to find an upstream wavelength. In this way, the wide attempt wavelength spacing embodiment for ONU calibration may guarantee that one of the attempt wavelengths is in the passband of the upstream channel of the OLT 105.

Figure 17:
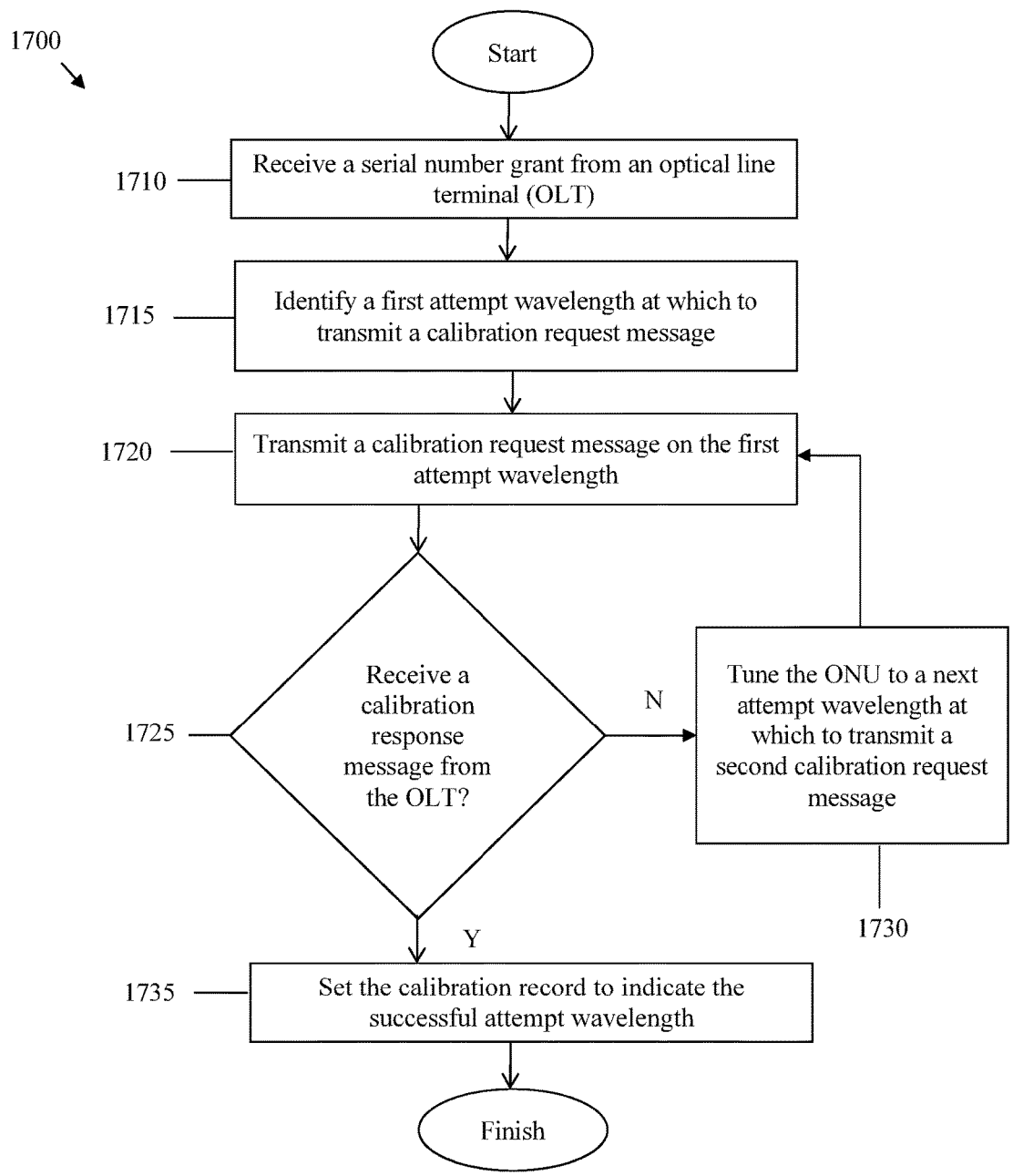
FIGS. 17 and 18 are flowcharts of ONU calibration according to various embodiments of the disclosure.

FIG. 17 is a flowchart illustrating a method 1700 of ONU calibration according to an embodiment of the disclosure. For instance, the method 1700 may be implemented by the ONU 150 of FIG. 1. At block 1710, an SN grant may be received from the OLT (e.g., the OLT 105 of FIG. 1). For example, an ONU may receive the SN grant from the OLT. The SN grant indicates a start time and a stop time of an extended quiet window. At block 1715, the ONU identifies a first attempt wavelength at which to transmit a calibration request message. For instance, a transmitter (e.g., the transmitter unit 240 of FIG. 2) of the ONU is tuned to transmit the first calibration request message at the first attempt wavelength.

At block 1720, the first calibration request message may be transmitted at the first attempt wavelength to the OLT. For example, the ONU may transmit the first calibration request message at the first attempt wavelength to the OLT. The calibration request message includes the start time associated with the SN grant. In this way, the start time and an identifier unique to the attempt wavelength are included in the calibration request message. The identifier and/or the start time facilitate in determining which attempt wavelength is the successful attempt wavelength.

At decision diamond 1725, it may be determined whether or not the calibration response message was received from the OLT. For example, the ONU waits for a predetermined period of time to see whether a calibration response message was received from the OLT. At block 1730, if a calibration response message is not received, then the ONU may be tuned, for example, to the next attempt wavelength at which to send a second calibration response message. The next attempt wavelength is determined based on the narrow attempt wavelength spacing embodiment described above with reference to FIG. 15 or the wide attempt wavelength spacing embodiment described above with reference to FIG. 16. At block 1720, the next calibration request message may be transmitted at the next attempt wavelength. For example, the ONU may transmit the next calibration request message.

At decision diamond 1725, it may again be determined whether or not the calibration response message was received from the OLT. For example, the ONU may determine whether or not the calibration response message was received. If the ONU, for example, does not receive a calibration response message within a predetermined amount of time, a transmitter of the ONU may be tuned to another attempt wavelength based on the various embodiment of the wavelength spacing disclosed herein. If a calibration response message was received from the OLT, then the ONU, for example, sets the calibration record to indicate the successful attempt upstream wavelength for the OLT. In one embodiment, the ONU receives an identifier of the successful attempt upstream wavelength in the calibration response message. The ONU may be configured to transmit data thereafter to the OLT using the identified successful upstream wavelength upon identifying the successful upstream wavelength.

Figure 18:
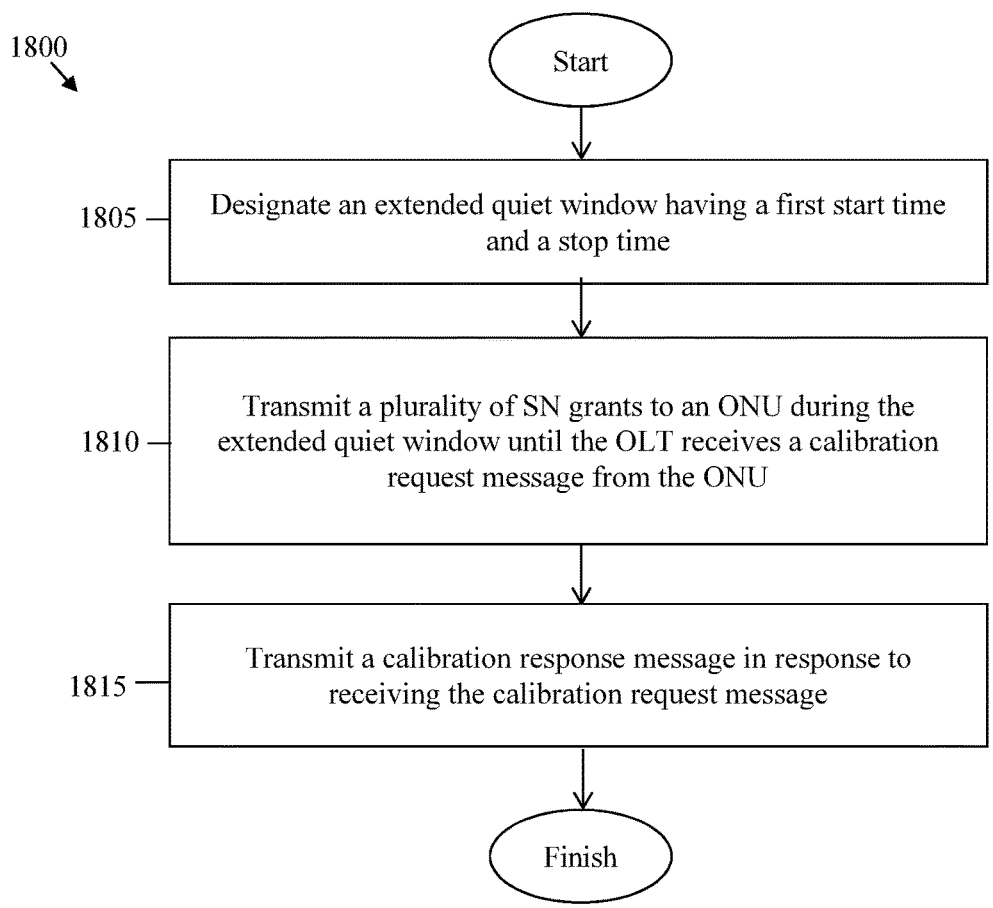

FIG. 18 is a flowchart illustrating a method 1800 of ONU calibration according to another embodiment of the disclosure. Specifically, the OLT 105 of FIG. 1 may execute the steps of the method 1800. First, at block 1805, an extended quiet window may be designated. For example, an OLT may designate an extended quiet window. The extended quiet window has a first start time and a stop time corresponding to the extended quiet windows 800 and 1200 shown in FIGS. 8 and 12, respectively. Next, at block 1810, a plurality of SN grants may be transmitted to an ONU during the extended quiet window until a calibration request message is received from the ONU. For instance, the OLT may transmit the plurality of SN grants to the ONU until the OLT receives a calibration request message. Each of the SN grants includes a time stamp indicating when the SN grant was transmitted and a serial number associated with the OLT. At block 1815, a calibration response message may be transmitted to the ONU in response to receiving the calibration request message, wherein the calibration response message comprises an identifier associated with an attempt wavelength associated with the calibration request message. For example, OLT transmits the calibration response message when the OLT receives the calibration request message.

The use of the term "about" means a range including ±10 percent (%) of the subsequent number, unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:
1. An optical line terminal (OLT) comprising:
a processor configured to:
designate a time period as an extended quiet window, wherein the time period ranges from a start time to a stop time, suspend upstream transmission during the extended quiet window;

a transmitter coupled to the processor and configured to transmit a plurality of serial number (SN) grants to an optical network unit (ONU) during the extended quiet window until a calibration request message is received, wherein each of the SN grants indicates the extended quiet window and comprises an SN associated with the OLT; and a receiver coupled to the processor and configured to receive the calibration request message from the ONU at an attempt wavelength during the extended quiet window, wherein the transmitter is further configured to transmit a calibration response message to the ONU in response to the calibration request message, and wherein the calibration response message comprises an identifier associated with the calibration request message.

2. The OLT of claim 1, wherein the time period is about 375 microseconds (μs).

3. The OLT of claim 1, wherein a channel spacing between the attempt wavelength and a second attempt wavelength is less than about 0.7 nanometers (nm), wherein the second attempt wavelength is associated with a second calibration request message.

4. The OLT of claim 1, wherein a channel spacing between the attempt wavelength and a second attempt wavelength is greater than or equal to about 0.7 nanometers (nm), wherein the second attempt wavelength is associated with a second calibration request message.

5. The OLT of claim 1, wherein the calibration request message and the calibration response message are physical layer operation, administration and maintenance (PLOAM) messages.

6. The OLT of claim 1, wherein the identifier is 16 bits.

7. The OLT of claim 1, wherein the identifier is further associated with the attempt wavelength.

8. An optical network unit (ONU) comprising:

a receiver configured to receive a serial number (SN) grant from an optical line terminal (OLT), wherein the SN grant indicates an extended quiet window and an SN associated with the OLT, and wherein the extended quiet window is a time period ranging from a start time to a stop time; and a transmitter configured to transmit a first calibration request message at a first attempt wavelength and a second calibration request message at a second attempt wavelength during the extended quiet window and in response to the SN grant, wherein the receiver is further configured to receive a calibration response message from the OLT in response to the first calibration request message or the second calibration request message, and wherein the calibration response message comprises an identifier associated with the first calibration request message or the second calibration request message.

9. The ONU of claim 8, wherein the first attempt wavelength and the second attempt wavelength are spaced apart by less than about 0.7 nanometers (nm).

10. The ONU of claim 8, wherein the first attempt wavelength and the second attempt wavelength are spaced apart by greater than or equal to about 0.7 nm.

11. The ONU of claim 8, wherein the extended quiet window is greater than 250 microseconds (μs).

12. The ONU of claim 8, wherein the receiver is further configured to receive a second SN grant during the extended quiet window, and wherein the transmitter is further configured to transmit the second calibration request message in response to receiving the second SN grant.

13. The ONU of claim 8, further comprising a processor configured to set a calibration record to indicate the second attempt wavelength in response to receiving the calibration response message from the OLT.

14. The ONU of claim 8, wherein the identifier is 16 bits.

15. The ONU of claim 8, wherein the identifier is further associated with the first attempt wavelength or the second attempt wavelength.

16. A method implemented in an optical line terminal (OLT), the method comprising:

designating an extended quiet window having a start time and a stop time;

transmitting a plurality of serial number (SN) grants to an optical network unit (ONU) during the extended quiet window until the OLT receives a calibration request message at an attempt wavelength from the ONU;

receiving the calibration request message at the attempt wavelength; and transmitting a calibration response message to the ONU in response to the calibration request message, wherein the calibration response message comprises an identifier associated with the calibration request message.

17. The method of claim 16, wherein transmitting the SN grants comprises:

transmitting a first SN grant; and transmitting a second SN grant subsequent to transmitting the first SN grant.

18. The method of claim 16, wherein the calibration request message comprises a field for a time period associated with random delay that occurs during calibration of the ONU.

19. The method of claim 16, wherein the SN grants comprise a first SN grant, and wherein the first SN grant comprises a time field indicating a time at which the OLT transmitted the first SN grant.

20. The method of claim 16, wherein the calibration request message and the calibration response message are physical layer operation, administration and maintenance (PLOAM) messages.

21. The method of claim 16, wherein the identifier is 16 bits.

22. The method of claim 16, wherein the identifier is further associated with the attempt wavelength.

* * * * *